United States Patent [19]

Anderson

[11] 4,330,369
[45] May 18, 1982

[54] THERMALLY ACTUATED LINKAGE ARRANGEMENT

[75] Inventor: Paul M. Anderson, San Diego, Calif.

[73] Assignee: General Atomic Company, San Diego, Calif.

[21] Appl. No.: 76,388

[22] Filed: Sep. 17, 1979

[51] Int. Cl.³ ............................................. G21C 19/20
[52] U.S. Cl. .................................. 376/268; 294/86 A; 337/394; 414/146; 376/270
[58] Field of Search .................... 176/30; 414/146; 294/86 A; 337/123, 394

[56] References Cited

U.S. PATENT DOCUMENTS

| | | | |
|---|---|---|---|
| 3,243,557 | 3/1966 | Fairbanks | 337/394 |
| 3,293,136 | 12/1966 | Harris | 176/30 |
| 3,383,286 | 5/1968 | Paget | 176/30 |
| 3,632,978 | 1/1972 | Wrob | 337/394 |

*Primary Examiner*—Donald P. Walsh
*Attorney, Agent, or Firm*—Fitch, Even, Tabin, Flannery & Welsh

[57] ABSTRACT

A reusable thermally actuated linkage arrangement includes a first link member having a longitudinal bore therein adapted to receive at least a portion of a second link member therein, the first and second members being sized to effect an interference fit preventing relative movement therebetween at a temperature below a predetermined temperature. The link members have different coefficients of thermal expansion so that when the linkage is selectively heated to a temperature above the predetermined temperature, relative longitudinal and/or rotational movement between the first and second link members is enabled. Two embodiments of a thermally activated linkage are disclosed which find particular application as actuators for a grapple head positioning arm in a nuclear reactor fuel handling mechanism to facilitate back-up safety retraction of the grapple head independently from the primary fuel handling mechanism drive system.

18 Claims, 10 Drawing Figures

THERMALLY ACTUATED LINKAGE ARRANGEMENT

The present invention relates generally to linkage arrangements for use in mechanical actuating systems, and more particularly to novel thermally actuated linkage arrangements which include first and second link members having generally telescoping relation and being interlocked through an interference fit at a predetermined operating temperature range, at least the interlocking portions of the link members having different coefficients of thermal expansion so that selective heating of the link members enables relative longitudinal and, in one embodiment, rotational movement therebetween.

One application in which the linkage arrangements of the present invention find particular use is in fuel handling mechanisms employed in nuclear reactors. Nuclear reactors conventionally include reactor housings which define fuel cores and have one or more upstanding access chutes or penetrations through which a retractable fuel handling mechanism may be inserted into the core for access to reactor components such as fuel elements or blocks generally adjacent the center axis of the penetration. In one form of known fuel handling mechanism, such as disclosed in U.S. Pat. No. 3,383,286, a grapple head is supported on one end of an extendible grapple head positioning arm which is pivotally mounted on the lower end of the fuel handling machine movable downwardly through an access chute into the core head space. The positioning arm is operatively associated with the control rod and drive assembly in a manner to enable positioning of the associated grapple head at selected positions radially spaced from the axis of the chute. The grapple head positioning arm is pivotal about an axis transverse to the axis of the access chute or penetration and may be rotated by the fuel handling machine while in an extended position to enable placement of fuel blocks in selected locations in the core. Movement of the grapple head positioning arm about its pivot axis may be effected through a fixed length actuator arm of linkage one end of which is connected to the grapple head positioning arm at the end thereof opposite the grapple head and spaced from the pivot axis of the positioning arm. The actuator arm or linkage has its opposite end connected to a power drive screw or the like to enable axial movement of the actuator linkage relative to the pivot axis of the grapple head positioning arm so as to effect pivotal movement of the grapple head positioning arm.

Other grapple head positioning arm arrangements may be employed which utilize a power drive screw to effect movement of an associated grapple head within a reactor core. It will be appreciated that to avoid costly shutdown should the drive mechanism or energizing means for the power drive screw become disabled or otherwise inoperative while the grapple head positioning arm is disposed in an extended position within the core cavity head space, the system must include back-up means which enables withdrawal of the grapple head through the corresponding access chute or penetration. In the aforementioned U.S. Pat. No. 3,383,286, such back-up means is provided by making at least a portion of the actuator arm or its pivot pin connections of material meltable at a temperature above the coolant temperature within the reactor vessel. When the actuator arm is subjected to such an elevated temperature, the actuator arm is disabled and the grapple head positioning arm swings downwardly by gravity until the grapple head is in underlying aligned relation to the access tube or chute. The need for an independent back-up system to enable retraction of the grapple head and associated grapple head positioning arm of the fuel handling mechanism is thus readily apparent.

One of the primary objects of the present invention is to provide a novel thermally activated linkage arrangement which in a predetermined temperature range assumes a substantially fixed length linkage condition, and which may be conditioned through selective heating to a temperature above the predetermined range to enable relative longitudinal movement between link members or elements comprising the linkage arrangement.

A more particular object of the present invention is to provide a reusable thermally activated linkage arrangement which may be employed in a nuclear reactor fuel handling mechanism to actuate a grapple head positioning arm and wherein the linkage arrangement is adapted for independent operation to enable withdrawal of the fuel handling mechanism from the reactor core in the event the primary control system should fail or otherwise become disabled.

A feature of the thermally activated linkage arrangement in accordance with the present invention lies in the provision of first and second link members or elements wherein one of the link members has a bore therein which receives at least a portion of the other link member in concentric telescoping relation therein and has a diametral interference fit therewith so that under a normal operating temperature range the linkage members are in relative fixed relation and constitute a fixed length actuator linkage adapted to support a longitudinal or rotational load. The link member having the bore therein has a greater coefficient of thermal expansion than the portion of the link member received in the bore, and has a heater band carried circumferentially thereof which enables heating of the outer link member sufficiently to allow relative longitudinal and/or rotational movement between the link members.

A feature of one embodiment of the invention lies in the provision of coil spring means cooperative with the first and second link members so as to urge them to axially extended positions relative to each other when an associated band heater is thermally activated to release the interfering portions of the link members.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

Figure 1:
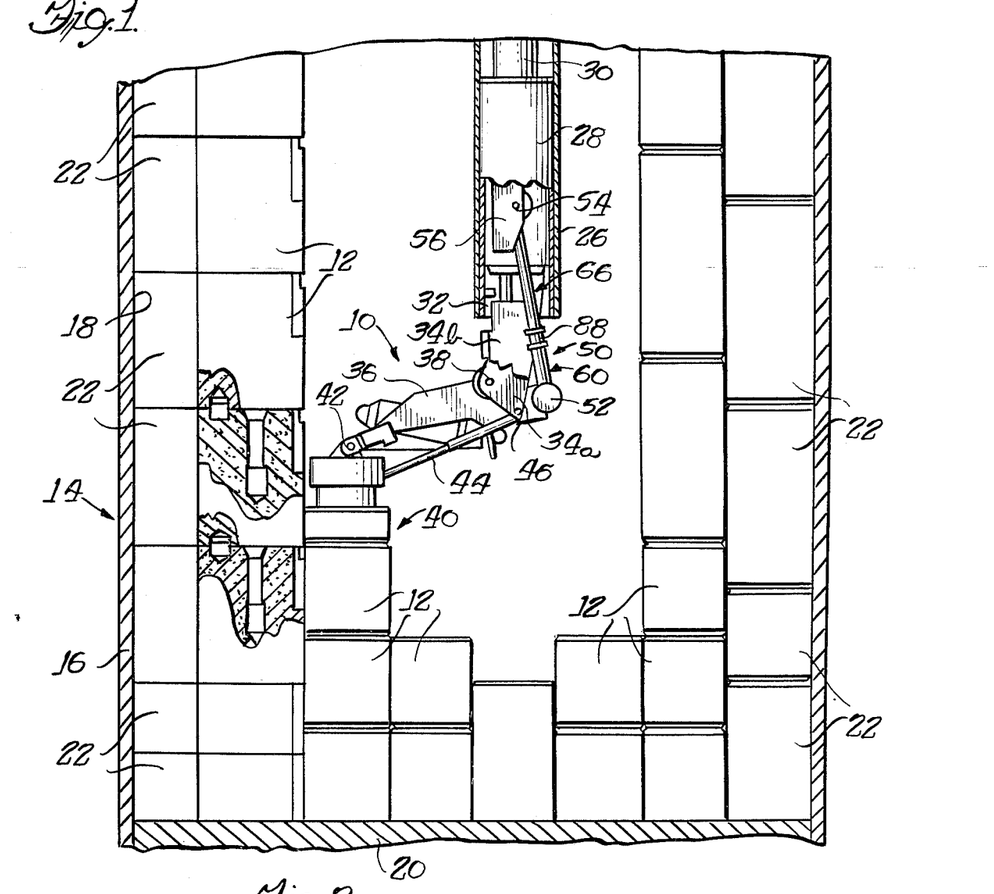
FIG. 1 is a fragmentary longitudinal sectional view of the reactive core of a nuclear reactor having a plurality of adjacent columns of fuel blocks and showing a portion of a fuel handling system for handling the fuel blocks.

Referring now to the drawings, and in particular to FIG. 1, one embodiment of the present invention is shown, by way of illustration, as being employed in a fuel handling mechanism, indicated generally at 10, employed in handling fuel elements or blocks 12 of the type employed in the reactive core 14 of a nuclear reactor vessel of conventional design. In the illustrated embodiment, the reactive core 14 includes a high strength circumferential wall 16 which defines an internal core cavity or chamber 18 the bottom of which is established by a supporting floor 20 which forms a support surface on which the fuel elements or blocks 12 are supported. The fuel elements or blocks 12 may be of conventional design such as hexagonal transverse cross-sectional configuration, and are adapted to be vertically stacked upon the support floor 20 to form a plurality of adjacent columns of separable fuel blocks. The outermost blocks, indicated at 22, peripherally of the fuel core may comprise reflector blocks, as is known. The fuel elements or blocks 12 and 22 are of conventional composition to provide the desired nuclear characteristics and may include moderating material, fertile material, fissile material, reflector material or combinations of some or all of these.

The nuclear reactor housing (not shown) in which the active core 14 is formed has at least one generally vertical penetration or access chute (not shown) which intersects the fuel core chamber 18 and facilitates insertion and withdrawal of fuel elements or blocks 12 into or from the reactive core by means of the fuel handling mechanism 10, as is known. For this purpose, the fuel handling mechanism 10 includes a tube or sleeve 26 which is adapted to be raised upwardly within the access penetration by a hoist mechanism (not shown). The fuel handling mechanism 10 may, for example, be of the type disclosed in the aforementioned U.S. Pat. No. 3,383,286 which is incorporated herein by reference for purposes of disclosure of the fuel handling mechanism.

Briefly, the fuel handling mechanism includes an inner tubular sleeve 28 which has operative association with an upper cylindrical tubular sleeve 30 so as to be fixed longitudinally relative to sleeve 26. The sleeve 28 may be rotated about its longitudinal axis relative to sleeve 26 by a drive motor and gear arrangement (not shown). The lower end of the tubular sleeve 28 has a transverse plate 32 affixed thereto to which is mounted a pair of laterally spaced support plates 34a and 34b. The support plates 34a, b pivotally support a grapple head positioning arm or link 36 for pivotal movement about a pivot axis 38 located intermediate the ends of the arm 36 such as at a point spaced from the upper end of the arm by a distance of approximately one-third its length. The positioning arm 36 may comprise a pair of parallel spaced arms which pivotally support a grapple head, indicated generally at 40, at the lower or outer ends of the positioning arm through a pivot shaft or pin 42. A rigid fixed length link 44 is connected between the grapple head 40 and a pivot connection 46 to the support plates 34a, b and forms with the support arm 36 a parallelogram support linkage arrangement for the grapple head which maintains the axis of the grapple head in substantially vertical orientation as the arm 36 is pivoted about its pivot axis 38.

To effect controlled pivotal movement of the grapple head positioning arm 36 about its pivot axis 38 so as to raise and lower the grapple head 40, a thermally actuated linkage arrangement or control arm, indicated generally at 50, is provided which has one end pivotally connected by a pivot pin 52 to the inner end of the positioning arm 36 opposite the grapple head 40. The linkage arrangement 50, which may be termed an actuator linkage, has its opposite end pivotally connected by a pivot pin 54 to a slide block 56 affixed to the lower end of a drive screw (not shown) which extends downwardly within the tubular sleeve 30 and which has operative association with a drive motor (not shown). The drive motor for the drive screw is adapted to be energized to rotate the drive screw so as to effect vertical movement of the slide block 56 relative to sleeves 26 and 28 in a manner described in greater detail in the aforereferenced U.S. Pat. No. 3,383,286. In this manner, vertical movement of slide block 56 relative to sleeves 26 and 28 can be effected to pivot the grapple head support arm 36 about its pivot axis 38 in a generally vertical plane so as to selectively position the grapple head 40 relative to the axis of the sleeve 28 of the fuel handling mechanism 10. Correspondingly, the aforementioned drive motor means (not shown) for rotating sleeves 28 and 30 within sleeve 26 is adapted to rotate the support arm 36 about the axis of sleeve 26 to facilitate a full scope of positioning of the grapple head 40 within the core cavity. The grapple head 40 and fuel blocks 12 are adapted for releasable coupling in a known manner.

It will be appreciated that in order to introduce the fuel handling mechanism 10 into the fuel core through a penetration or access chute in the reactor or remove the fuel handling mechanism therefrom, the grapple head positioning arm 36 and associated grapple head 40 must be positioned so as to substantially vertically underlie the tube 26 in aligned relation therewith. Upon entry of the fuel handling mechanism into the reactor core head space, the actuator linkage 50 may be actuated by the associated slide block 56 to pivot the arm 36 outwardly so that the grapple head 40 is disposed in a desired position spaced from the axis of sleeve 36. At this point, should the motor control means and drive screw associated with the slide block 56 become disabled or otherwise inoperative, the support arm 36 and associated grapple head 40 would be disposed in a position preventing withdrawal of the fuel transfer mechanism from the access chute or penetration, thus requiring substantial downtime for the reactor to enable servicing and repair.

In accordance with the present invention, the actuator linkage or control arm 50 comprises a reusable thermally activated linkage which, during operation within a predetermined temperature range such as the normal safe operating temperature range of the reactor coolant, acts as a fixed length linkage through which longitudinal and/or rotational forces may be transmitted directly from a first operator member, i.e. slide block 56, to a second operated member, i.e. positioning arm 36. As will become apparent hereinbelow, when the actuator linkage 50 or a selected portion thereof is heated to a temperature above the predetermined temperature, longitudinal foreshortening of the linkage is enabled. Thereafter, the actuator linkage 50 may be returned to its initial condition.

The thermally actuated linkage arrangement 50 finds particular application in the fuel handling mechanism 10 illustrated in FIG. 1 as the linkage or arm connecting the end of grapple head positioning arm 36 opposite the grapple head 40 to the slide block 56 to facilitate selective pivotal movement of positioning arm 36 about its pivot axis 38 and thus serves as a load carrying member, but which may be selectively enabled for telescoping or foreshortening under the weight of the grapple head so as to allow movement of the positioning arm and associated grapple head to positions immediately underlying and generally axially aligned with the tubular sleeve 26.

Figures 2, 3, 4, 5:
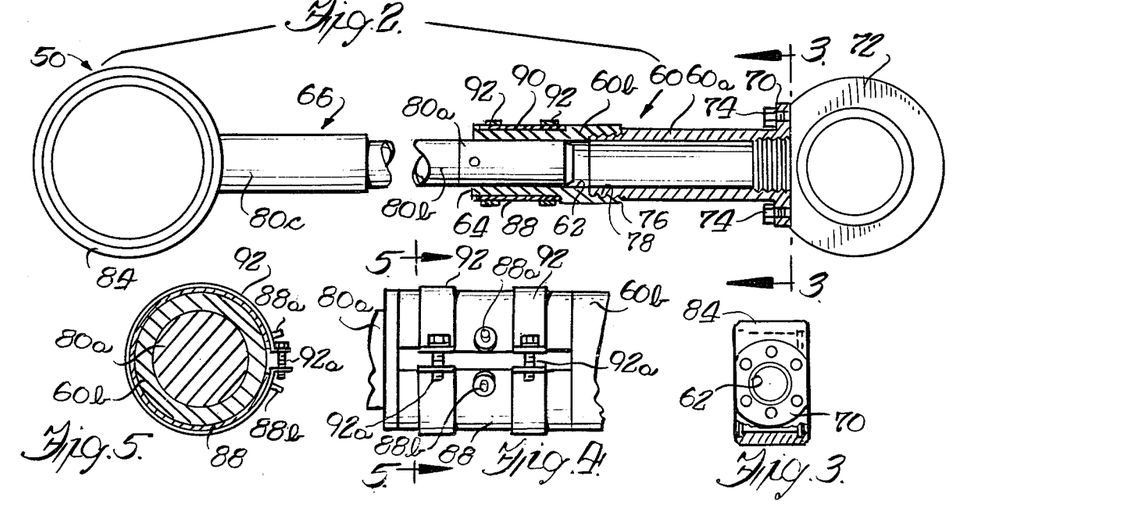
FIG. 2 is a foreshortened side elevational view, on an enlarged scale and taken partially in longitudinal section, of the thermally activated linkage arrangement employed in the fuel handling mechanism of FIG. 1.
FIG. 3 is a transverse sectional view, on a slightly reduced scale, taken substantially along line 3—3 of FIG. 2 looking in the direction of the arrows.
FIG. 4 is a fragmentary side elevational view showing the manner of mounting the band heater on the linkage arrangement of FIG. 2.
FIG. 5 is a transverse sectional view taken substantially along line 5—5 of FIG. 4.

With particular reference to FIGS. 2 and 3, taken in conjunction with FIG. 1, the thermally activated actuator linkage 50 includes a first metallic link member, indicated generally at 60, which defines a longitudinal bore 62 opening outwardly of an end surface 64. The linkage 50 also includes a second metallic link member, indicated generally at 66, at least a portion of which is adapted to be received within the bore 62 of link member 60 in substantially coaxial relation therewith.

In accordance with an important feature of the actuator linkage 50, at least a portion of the link member 60 defining the bore 62, and at least a portion of the link member 66 which is received within the bore 62 are formed to have an accurate diametral interference fit therebetween so that when the linkage 50 is operating below a predetermined temperature, the first and second link members are in fixed longitudinal and rotational relation to each other. In this condition, the actuator linkage is operative to support a mechanical load which may effect either an axial compressive or tensile load on the linkage or which may apply a rotational moment to one of the link members relative to the other. The portion of the first link member 60 which receives the second link member 66 in coaxial relation therein is made of a metallic material having a higher coefficient of thermal expansion than the material from which the corresponding inserted coaxial portion of the second link member 66 is made so that when the linkage 50, or at least the portion of link member 60 having an interferencee fit with the link member 66, is subjected to a temperature higher than the aforenoted predetermined temperature, the interference fit is reduced to substantially zero enabling telescoping and relative rotation between the first and second link members 60 and 66, respectively.

In accordance with the illustrated embodiment, the first link member 60 includes a tubular connector sleeve end 60a which has a radial flange 70 at one end thereof to facilitate connection to an annular bearing sleeve 72 as through screws 74. The bearing sleeve 72 facilitates pivotal connection of one end of the linkage 50 to a pivot pin, such as the pivot pin 52 forming the pivotal connection of the actuator linkage to the positioning arm 36 in FIG. 1. The end of the connector sleeve 60a opposite flange 70 has an external thread 76 formed thereon for threaded connection with an internal thread 78 formed in a tubular sleeve 60b. In assembled relation, the sleeves 60a and 60b are axially aligned and define the bore 62 therethrough.

In the preferred embodiment, the sleeve 60b is made of a metallic material having a predetermined coefficient of thermal expansion which may be different than the coefficient of thermal expansion of the sleeve portion 60a. In this case, the portion of longitudinal bore 62 within sleeve 60b is made of predetermined diameter so as to establish an accurate diametral interference fit with the end of link member 66 received therein when at a temperature below a predetermined temperature. The portion of the bore 62 within the connector sleeve 60a may then be slightly greater than the bore within sleeve 60b so as not to have an interference fit with link member 66, but preferably establishes a generally sliding relation with the inserted portion of link member 66 throughout the full operating temperature range of the linkage 50.

The second link member 66 may be formed integral or, in the preferred embodiment, may comprise a plurality of axially connected portions such as a cylindrical end portion 80a, a cylindrical intermediate portion 80b, and a connector end 80c, all of which are suitably fixedly secured together in axial alignment. The connector end 80c has an annular bearing sleeve 84 suitably secured thereto, as by welding or other suitable means, so that the axes of the bearing sleeves 72 and 84 lie on the axis of the connected link members 60 and 66 in generally transverse relation thereto. The annular bearing sleeve 84 facilitates connection of the link member 66 to a pivot pin such as the pivot pin 54 in the embodiment of FIG. 1 so as to provide a pivotal connection of the linkage 50 to an operating member such as the slide block 56.

The cylindrical end portion 80a of link member 66 is received within the sleeve portion 60b of link member 60 and, as noted, is formed from a metallic material having cylindrical outer surface dimensioned to form a predetermined diametral interference fit with the sleeve portion 60b during the period in which the linkage 50, or at least the connected portions of links 60 and 66, are disposed at an operating temperature below a predetermined temperature. The portions 80b and 80c of the second link member 66 may, in the preferred embodiment, be formed of a different metallic material than the portion 80a, namely, a suitable economical material. The intermediate portion 80b of the link member 66 is preferably formed with a slightly smaller diameter than the end portion 80a so as to have sliding relation within the bore 62 throughout the full operating temperature range to which the linkage 50 may be subjected.

To enable selective heating of the coaxial interfitting portions 60b and 80a, respectively, of the first and second link members 60 and 66, and particularly the sleeve portion 60b of link member 60, a heating band 88 is mounted on sleeve portion 60b so as to extend about substantially the full circumference thereof. As best seen in FIGS. 2, 4 and 5, the heating band 88 may comprise a metallic strip of suitable heatable material which is formed to lie in a circumferential recess 90 formed in the outer surface of sleeve portion 60b. In the illustrated embodiment, the heating band 88 is secured about sleeve 60b within recess 90 by a pair of conventional generally C-shaped clamps 92 having their ends secured by screws 92a, as is known. The heating band 88 has a pair of electrodes 88a and 88b secured thereon at its mutually opposing edges to facilitate connection of the heating band with a suitable electrical source independent of the circuit to the control motors for the fuel handling mechanism 10 so that a separate voltage can be applied to the heating band to heat the underlying sleeve portion 60b of link 60 to a temperature above the aforementioned predetermined temperature below which an interference fit exists between the link members 60 and 66, the increased temperature effected by the heating band being sufficient to reduce the interference fit to substantially zero. In this manner, the link member 66 may telescope within or rotate relative to link 60.

One example of a material from which the sleeve portion 60b of link member 60 may be made is beryllium copper, while the connector sleeve portion 60a may be made of stainless steel. The end portion 80a of the link member 66 may be made of 410 stainless steel having a chrome plated outer surface to improve wear, while the remaining portions 80b and 80c may be made of a suitable strength steel. The heating band 88 may be made of 430 stainless steel.

In reviewing the operation of the thermally activated actuator linkage 50, and particularly as it may be employed in the fuel handling mechanism 10 illustrated in FIG. 1, it will be appreciated that with the link members 60 and 66 fixedly connected together through the interference fit established between the sleeve portion 60b of link 60 and the end portion 80a of link 66, the linkage may be employed as a fixed length control arm between the slide block 56 and the grapple head positioning arm 36 so that movement of the slide block longitudinally relative to sleeve 26 operates to pivot the positioning arm 36 about its pivot axis 38 and move the grapple head 40 radially relative to the axis of sleeve 26. During this mode of operation, the linkage 50, including heating band 88, will be disposed at a normal operating temperature range within the reactor core, such as the temperature of the reactor coolant. Should the drive means (not shown) for the slide block 56 fail or otherwise become disabled, the separate heating circuit (not shown) to the heating band 88 can be energized independently of the control circuit for the fuel transfer mechanism drive means so as to heat the heating band to a temperature above the normal operating temperature and thereby thermally expand the underlying sleeve portion 60b of link 60 a greater amount than the end 80a of link member 66, thus reducing the interference fit sufficiently to enable telescoping of the link 66 within bore 62 in link 60. In this manner, the weight of the grapple head 40 will cause the positioning arm 36 to pivot about its pivot axis 38 and effect telescoping or shortening of the linkage 50, thus allowing movement of the grapple head and positioning arm 60 to positions substantially axially underlying sleeve 26 whereby the fuel transfer mechanism 10 may be raised through its associated access chute or penetration in the nuclear reactor housing.

It will be appreciated that with the sleeve portion 60b of link member 60 heated sufficiently to reduce the interference fit with link member 66 to substantially zero, relative rotation between the link members could also be undertaken. Such relative rotation may be utilized in applications other than the illustrated fuel handling mechanism. It will also be appreciated that when the heating band 88 is deenergized so that the associated link members return to their normal operating temperature range, the link members will undergo regripping to form a fixed length linkage wherein the link members are prevented from relative longitudinal and rotational movement by the interference fit therebetween.

FIGS. 6–10 illustrate an alternative embodiment of the present invention employed in a fuel handling mechanism, a portion of which is indicated generally at 100, which may be utilized in the aforedescribed reactor core 14 to handle components within the reactor core such as the fuel elements or blocks 12. More particularly, the fuel handling mechanism 100 includes a generally channel shaped frame 102 having parallel laterally spaced side walls 102a and 102b (FIG. 7) interconnected through a rear wall 102c. The walls 102a–c are connected at their upper ends to a transverse support plate 104 which provides a means for supporting the fuel handling mechanism for movement longitudinally upwardly or downwardly within an access chute or penetration in a reactor housing and enables rotation of the fuel handling mechanism about the axis of the penetration when disposed within the reactor fuel core cavity.

Figures 6, 7, 8, 9, 10:
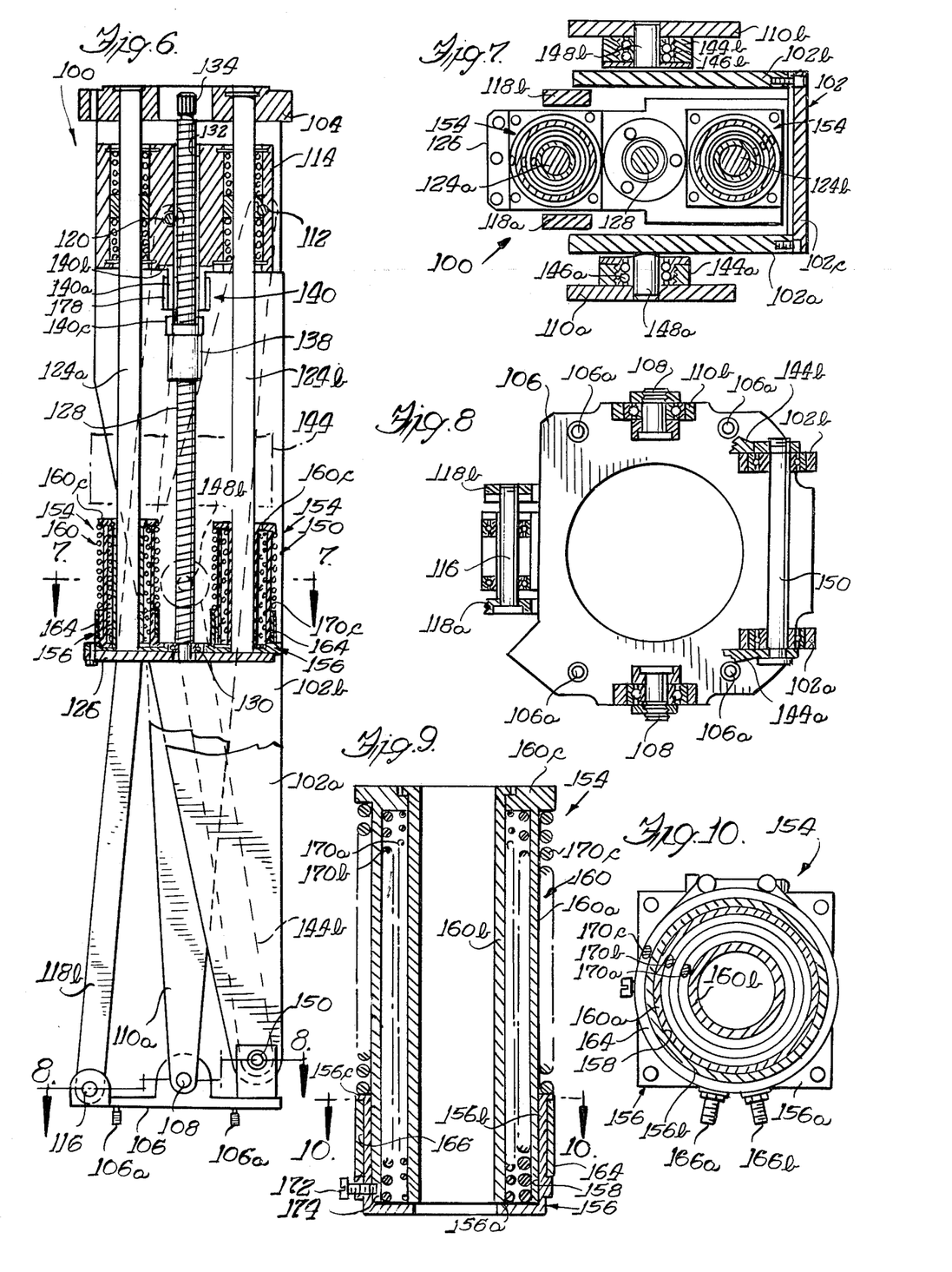
FIG. 6 is a fragmentary longitudinal sectional view of a fuel handling mechanism employing a thermally actuated linkage arrangement in accordance with an alternative embodiment of the present invention.
FIG. 7 is a transverse sectional view taken along line 7—7 of FIG. 6.
FIG. 8 is a transverse sectional view taken along line 8—8 of FIG. 6.
FIG. 9 is a longitudinal sectional view, on an enlarged scale, of the thermally actuated linkage arrangement of FIG. 6.
FIG. 10 is a transverse sectional view taken along line 10—10 of FIG. 9.

The fuel handling mechanism 100 includes a grapple head support plate 106 which has a plurality of mounting bolts or studs 106a thereon adapted to support a grapple head (not shown), such as the aforementioned grapple head 40. The support plate 106 is supported on the lower end of a parallelogram linkage arrangement in a manner to enable radial movement of the grapple head within the fuel core relative to the longitudinal axis of the access penetration in the reactor housing. The parallelogram linkage arrangement serves as a grapple head positioning arm for the fuel handling mechanism 100.

With particular reference to FIGS. 6–8, the grapple head support plate 106 is pivotally connected at 108 to the lower ends of a first pair of parallel laterally spaced links or index arms 110a and 110b the upper ends of which are pivotally connected at 112 to a crosshead 114. The grapple head support plate 106 is also pivotally connected at 116 to the lower ends of a second pair of parallel laterally sapced links 118a and 118b, termed stabilizing links, the upper ends of which are pivotally connected at 120 to the crosshead 114 so that the pairs of links 110a,b and 118a,b form the aforementioned parallelogram linkage arrangement to maintain the grapple head support plate 106 is a substantially horizontal plane parallel to the plane of the upper support block 104 as the grapple head is moved laterally within the reactor fuel core, as will be described hereinafter.

The crosshead 114 is mounted on and slidable along a pair of parallel guide shafts 124a and 124b which have their opposite ends fixed, respectively, to the transverse support plate 104 and a transverse platform 126 secured to and between the lateral sidewalls 102a and 102b of the channel frame 102. Preferably, ball bushings are interposed between the crosshead 114 and the guide shafts 124a,b as illustrated in FIG. 6 A ball screw shaft 128 is rotatably supported at its lower end on the platform 26, as through a bearing 130, and extends upwardly through a longitudinal bore 132 in the crosshead 114, the upper end of the screw shaft having a peripheral spline surface 134 formed thereon for connection to a control motor (not shown) to effect selective rotation of the screw shaft 128, as is known.

The crosshead 114 is coupled to the ball screw shaft 128 through a ball screw nut 138 of conventional design which is connected to the crosshead through a thermally actuated release linkage, indicated generally at 140 and alternatively termed a ball screw mounting assembly, such that during a predetermined normal temperature operating range for the fuel handling mechanism 100, selective rotation of the screw shaft 128 will effect upward or downward movement of the crosshead 114.

In order to effect lateral movement of the grapple head support plate 106 relative to the longitudinal axis of the screw shaft 128 during movement of the crosshead 114 along the guide shafts 124a,b a pair of laterally spaced parallel connecting links 144a and 144b are pivotally connected at their upper ends to approximately the mid-lengths of the index arms 110a and 110b, respectively, through bearings 146a,b and suitable pivot pins 148a,b, as illustrated in FIGS. 6 and 7. The lower ends of the connecting links 144a,b are pivotally connected to the lower ends of the lateral sidewalls 102a,b, respectively, of the frame 102 through a transverse pivot shaft 150 received through suitable aligned openings in the links 144a,b and frame sidewalls 102a,b, as illustrated in FIG. 8. With the grapple head support plate 106 pivotally connected to the lower ends of the parallel links 110a,b and 118a,b, and with the connecting links 144a,b pivotally connected to the links or index arms 110a,b and also pivotally connected to the frame 102 as described, it will be appreciated that downward movement of the crosshead 114 will effect a lateral outward movement of the grapple head support plate from the longitudinal axis of the ball screw 128, while upward movement of the crosshead will effect a reverse movement or retraction of the grapple head 106 to a position axially aligned with the ball screw shaft. In this manner, and with the illustrated portion of fuel handling mechanism 100 disposed within a reactor core chamber 18 such as illustrated in FIG. 1, a grapple head mounted on the grapple head support plate 106 may be moved to a selected radial position within the core for manipulating core elements such as fuel, control and/or shielding blocks.

As was previously described in respect to the fuel handling mechanism 10, the grapple head support plate 106 and associated grapple head of the fuel handling mechanism 100 must be positioned in substantially vertical alignment with the axis of the penetration or access chute in the reactor housing in order to introduce the fuel handling mechanism into the fuel core chamber or remove it therefrom. Similarly, should the motor control (not shown) for the ball screw shaft 128 become disabled or otherwise inoperative when the grapple head support plate 106 and grapple head carried thereon are disposed within the core chamber and displaced laterally from the axis of the screw shaft, removal or withdrawal of the fuel transfer mechanism 100 from the reactor core chamber would be prevented without substantial downtime for the reactor to enable disassembly and repair of the fuel handling mechanism.

In accordance with an important feature of the embodiment illustrated in FIGS. 6-10, a thermally actuated linkage arrangement in the form of a pair of identical thermally actuated spring return assemblies, each of which is indicated at 154, is employed in the fuel handling mechanism 100 to enable selective return of the crosshead 114 to its initial upper position on the guide shafts 124a,b and effect return of the grapple head support plate 106 to a position axially underlying the ball screw shaft 128 in the event the drive control for the ball screw shaft should become disabled when the grapple head is disposed in a laterally outward position from the axis of the ball screw shaft. As will become more apparent hereinbelow, the thermally actuated spring return assemblies 154 cooperate with the aforementioned thermally actuated release linkage 140 to enable return of the crosshead 114 to its upper or raised position and effect return of the grapple head support plate to a position axially underlying the ball screw shaft 128.

With particular reference to FIGS. 9 and 10, taken in conjunction with FIG. 6, each thermally activated spring return assembly 154 includes a first link member 156 having a generally planar base plate 156a and an upstanding annular wall 156b formed integral with the base plate 156a and defining an internal cylindrical bore 158 of precise predetermined diameter. The spring return assembly 154 includes a second link member 160 which, in the illustrated embodiment, comprises a spring return housing having a pair of concentric annular walls 160a and 160b interconnected at their upper ends to define a generally planar upper end plate or wall 160c. The outer cylindrical surface of at least the lower portion of the outer concentric wall 160a is formed of a predetermined diameter so as to form an interference press fit with the inner surface 158 of the link member 156 when received within the bore 158. In this condition, the link members 156 and 160 form a substantially fixed length linkage. The link members 156 and 160 are made of metallic material having different coefficients of thermal expansion, the annular wall 156b being made of a material having a greater coefficient of thermal expansion than the portion of the wall 160a received within the bore 150a. In this manner, selective heating of at least the annular wall 156b of link member 156 to a predetermined temperature will create an assembly clearance allowing insertion of the link member 160 within the bore 158 after which a reduction in temperature effects a predetermined interference press fit. Correspondingly, subsequent heating of the annular wall 156b to a predetermined temperature will release link member 160.

To effect such heating of link member 156, a heating band 164 is mounted within an annular recess 166 formed about the annular wall 156b. The heating band 164 has a pair of electrodes 166a and 166b mounted thereon to facilitate connection of the heating band to a suitable control circuit in similar fashion to the aforedescribed heating band 88.

A pair of concentric coil compression springs 170a and 170b are disposed within the annular space between the concentric annular walls 160a and 160b of the link member 160 such that the opposite ends of the compression springs abut the base plate 156a of link member 156 and the end wall 160c of the link member 160. A similar coil compression spring 170c is concentrically mounted about the outer periphery of the annular wall 160a of link member 160 and has its opposite ends abutting the end wall 160c and an annular flange 156c on link member 156. The coil compression springs 170a, b and c are selected so as to be compressed when the link members 156 and 160 are assembled as shown in FIG. 9, but are of sufficient free length and spring rate to effect relative longitudinal movement between the first and second link members when the heating band 164 is energized sufficiently to release the link members.

To facilitate mechanical retention of link member 160 within the bore 158 in link member 156, a lock screw 172 is supported within a suitable threaded bore within the annular wall 156b and is adapted to be received within an opening 174 in the annular wall 160a of link member 160 when fully inserted within the bore 158.

The lock screw 172 may thus be employed to prevent inadvertent release of the link members 156 and 160 during handling, it being understood that screw 172 is released from opening 174 during normal operation of the spring return assembly 154.

As illustrated in FIGS. 6 and 7, a spring return assembly 154 is mounted on the lower end of each guide shaft 124a,b and has its base plate 156a suitably secured to the transverse platform 126. The compression springs 170a,b and c are selected so that when the crosshead 114 is moved downwardly on the screw shaft 128, such as to the position shown in phantom in FIG. 6, to move the grapple head support plate 106 laterally outwardly, release of the link members 160 from their assembled relation within the corresponding bores 158 of link members 156 allows the springs to expand and move the associated link members 160 upwardly against the crosshead 114. With the crosshead released from the ball screw shaft 128, the force thus exerted on the crosshead by the link members 160 is sufficient to move the crosshead upwardly to its initial upper position and return the grapple head support plate 106 to a position axially underlying the ball screw shaft.

As aforementioned, the thermally activated release link 140 normally operates to maintain the ball screw coupling 138 connected to the crosshead 114 so that selective rotation of the ball screw shaft 128 moves the crosshead upwardly and downwardly. Should the drive for the screw shaft 128 become inoperative when the crosshead 114 is in lowered position, it is necessary to release the crosshead from the screw shaft 128 to enable upward return of the crosshead under the aforedescribed action of the spring return assemblies 154. To this end, the release lnk 140 has a first metallic tubular link member 140a which is mounted on the crosshead 114 through an annular flange 140b so that the tubular portion 140a is axially aligned with the bore 132 in the crosshead. The release link 140 includes a second metallic generally tubular link member 140c which is secured to the ball screw nut 138 and extends upwardly within the link member 140a in concentric relation therewith.

The portion of link member 140c received within link member 140a has an interference force fit therewith at normal operating temperatures of the material handling mechanism 100 so as to form a fixed link between the ball screw nut 138 and the crosshead 114. The material from which at least the tubular portion of the link member 140a is made has a higher coefficient of thermal expansion than the material from which the tubular link member 140c is made so that when the assembled link members 140a and 140c, or at least the outer link member 140c, are heated to a predetermined temperature, as through a heating band 178 assembled on the outer surface of link member 140c, the link members 140a and 140c will release to disconnect the ball screw nut 138 from the crosshead 114. The heating band 178 has suitable electrodes thereon (not shown) similar to the electrodes 166a, b on heating band 164 which facilitate connection of heating band 178 in a suitable energizing circuit.

In the operation of the fuel handling mechanism 100, the heating band 164 on each of the spring return assemblies 154 and the heating band 178 on the thermally activated release link 140 are connected to a suitable energizing circuit, such as a common energizing control circuit, independently of the electrical controls for the various control motors which effect vertical movement and rotation of the material handling mechanism 100 within the reactor core, and which effect rotation selective of the ball screw shaft 128. Should the drive motor for the ball screw shaft 128 become disabled or inoperative when the crosshead 114 is in a lowered operating position with the grapple head plate 106 and associated grapple head moved laterally outwardly to an extended operating position, the heating bands 164 and 178 are energized to raise the temperatures of the associated link members sufficiently to release the link members 140a and 140c of release link 140 and release the link members 156 and 160 of the sprisng return assemblies 154. The compression springs 170a, b and c then effect upward engagement of the end wall 160c against the crosshead 114 with sufficient force to return the crosshead to its center position and cause return of the grapple head to a position axially underlying the penetration in the reactor housing through which the material handling mechanism 100 may be withdrawn.

While the linkage arrangements 50 and 154 and the release link 140 have been illustrated and described as having heating bands disposed circumferentially of the outer ones of the concentric press fit portions of the respective link members, it will be appreciated that alternative heating means could be employed. For example, heating electrodes, could be connected to the inner ones of the concentric link portions, and the inner links heated sufficiently to induce heating of the corresponding outer links to effect the desired thermal expansion and release of the link members.

The thermally activated linkage arrangement 50 illustrated in conjunction with material handling mechanism 10 and the thermally activated linkage arrangements comprising spring return assemblies 154 illustrated in conjunction with material handling mechanism 100, provide a number of advantages which enhance their use in emergency or secondary grapple head release systems. For example, relatively large loads need not be applied to a grapple arm in order to shear or fail a mechanical member to enable movement of the grapple head to a position allowing withdrawl of the associated fuel handling mechanism. Rather, the thermally activated linkage arrangements of the present invention may be operated through simple independent electrical control circuits operative to energize the respective heating bands.

The thermally activated linkage arrangements 50 and 154 are reusable without need for replacement components such as shear pins, bolts or other links, and such reuse may be effected without equipment disassembly. Additionally, the energizing control circuits for the heating bands may be readily tested online by continuity or resistance checks or by actually energizing the heaters to some limited temperature and remotely monitoring the temperature. The accurate dimensional tolerances may be readily obtained with conventional manufacturing techniques. The thermal expansion characteristics of the thermally activated linkage members will not deteriorate with age due to the fact that the thermal coefficients of expansion of the materials employed are stable with time. In the case of the linkage arrangements 50 and 140, the linkage members are adapted for increasing or decreasing composite length and/or joint rotation.

While preferred embodiments of the present invention have been illustrated and described, it will be understood that changes and modifications may be made therein without departing from the invention in its broader aspects. Various features of the invention are defined in the following claims.

I claim:

1. A thermally activated linkage arrangement comprising a first link member defining a longitudinal bore therein opening outwardly of at least one end of said link member, a second link member having at least a portion thereof adapted to be received within said bore and sized to establish an interference fit between the outer peripheral surface of said second link member and the inner bore surface of said first link member sufficient to prevent relative movement between said first and second link members when disposed at or below a predetermined temperature but enabling relative longitudinal movement between said first and second link members when at least the interfitting portion of said first link member is disposed at a temperature above said predetermined temperature, said interfitting portions of said first and second link members having different coefficients of thermal expansion, and heating means operatively associated with said interfitting portion of said first link member in a manner to enable selective heating thereof so as to reduce said interference fit to substantially zero and facilitate relative longitudinal movement between said first and second link members.

2. A thermally activated linkage arrangement as defined in claim 1 wherein said first link member comprises a straight metallic member having said bore formed longitudinal therein, said second link member having at least a portion thereof having a straight longitudinal axis and adapted to be received within said bore in said first link member.

3. A linkage arrangement as defined in claim 2 wherein said bore is cylindrical in transverse cross section, said straight portion of said second link member having a cylindrical outer configuration adapted to be received within said bore, said first and second link members being adapted for relative rotation therebetween when said interfitting portion of said first link member is disposed at said temperature above said predetermined temperature.

4. A linkage arrangement as defined in claim 1 wherein said heating means comprises an electrically heatable band disposed circumferentially of said first link member in contacting relation therewith and in substantially coaxial relation to said bore.

5. A linkage arangement as defined in claim 4 wherein said electrically heatable band comprises a metallic heating band mounted circumferentially on said first link member in overlying coaxial relation to the portion of said second link member received in said bore.

6. A linkage arrangement as defined in claim 2 wherein said first link member has an annular groove formed circumferentially thereabout in coaxial relation with said bore, said heating means comprising an electrically heatable heating band disposed within said groove in contacting relation with said first link member.

7. A linkage arrangement as defined in claim 1 including spring means operatively associated with said first and second link members and adapted to urge said link members to longitudinally extended positions relative to each other when said interference fit is reduced to substantially zero.

8. In a fuel handling mechanism for a nuclear reactor which includes a grapple positioning arm adapted to support a grapple head generally adjacent one end of said positioning arm, means supporting said positioning arm for pivotal movement about a pivot axis transverse to its longitudinal length, and actuator means operatively associated with said positioning arm and operative to pivot said arm about its pivot axis so as to enable selective positioning of said grapple head; the improvement wherein said actuator means comprises a thermally activated linkage arrangement including a first link member defining a bore therein opening outwardly of an end of said link member, a second link member having at least a portion thereof adapted to be received within said bore and sized to establish an interference fit between the outer surface of said second link member and the inner bore surface of said first link member sufficient to prevent relative movement between said first and second link members when disposed at or below a predetermined temperature but enabling relative longitudinal movement between said first and second link members when at least the interfitting portion of said first link member is disposed at a temperature above said predetermined temperature, said interfitting portions of said first and second link members having different coefficients of thermal expansion, and heating means operatively associated with said interfitting portion of said first link member in a manner to enable selective heating thereof so as to reduce said interference fit to substantially zero and facilitate relative longitudinal movement between said first and second link members.

9. The improvement as defined in claim 8 wherein said first link member comprises a straight metallic member having said bore formed longitudinal therein, said second link member having at least a portion thereof having a straight longitudinal axis and adapted to be received within said bore in said first link member.

10. The improvement as defined in claim 9 wherein said bore is cylindrical in transverse cross section, said straight portion of said second link member having a cylindrical outer configuration adapted to be received within said bore, said first and second link members being adapted for relative rotation therebetween when said interfitting portion of said first link member is disposed at said temperature above said predetermined temperature.

11. The improvement as defined in claim 8 wherein said heating means comprises an electrically heatable band disposed circumferentially of said first link member in contacting relation therewith and in substantially coaxial relation to said bore.

12. The improvement as defined in claim 11 wherein said electrically heatable band comprises a metallic heating band mounted circumferentially on said first link member in overlying coaxial relation to the portion of said second link member received in said bore.

13. The improvement as defined in claim 8 wherein said first link member has an annular groove formed circumferentially thereabout in coaxial relation with said bore, said heating means comprising a heating band disposed within said groove in contacting relation with said first link member.

14. The improvement as defined in claim 8 wherein said heating means comprises a heating band mounted on said first link member in a manner to enable heating the portion thereof having said interference fit with said second link member.

15. The improvement as defined in claim 8 wherein said first link member includes at least two substantially axially aligned portions defining said bore therein and having different coefficients of thermal expansion, said portion having the higher coefficient of thermal expansion being sized to establish said interference fit with said second link member, said heating means comprising a heating band mounted on said portion having said higher coefficient of thermal expansion and being adapted to enable heating thereof to a temperature sufficient to reduce said interference fit to substantially zero.

16. The improvement as defined in claim 8 including spring means operatively associated with said first and second link members and adapted to urge said link members to longitudinally extended positions relative to each other when said interference fit is reduced to substantially zero.

17. The improvement as defined in claim 15 wherein said fuel handling mechanism includes a support frame, said actuator means including a crosshead supported by said frame for movement relative thereto, said crosshead being cooperative with said grapple positioning arm and adapted for movement between a first position wherein said grapple positioning arm is disposed in predetermined relation to said frame and a second position wherein said grapple positioning arm is moved from said predetermined relation to said frame, said spring means being operative to urge said crosshead to its said first position when said interference fit is reduced to substantially zero.

18. The improvement as defined in claim 16 wherein said fuel handling mechanism includes a screw shaft supported by said frame for rotation about its longitudinal axis, said actuator means including a screw shaft nut mounted on said screw shaft so as to be moved along the length of said shaft upon rotation thereof, and release link means interconnecting said nut to said crosshead so as to effect movement of said crosshead with said nut, said release link being adapted for thermal activation to release said crosshead from said nut to enable movement of said crosshead independent of said screw shaft when said interference fit between said first and second link members is reduced to substantially zero.

* * * * *